United States Patent [19]

Broadhurst

[11] Patent Number: 5,269,925

[45] Date of Patent: Dec. 14, 1993

[54] FILTER COMPRISING MULTIPLE LAYERS OF NON-WOVEN FILTER FABRIC OF DECREASING POROSITY

[75] Inventor: Thomas E. Broadhurst, Sarnia, Canada

[73] Assignee: Exxon Research and Engineering Company, Florham Park, N.J.

[21] Appl. No.: 878,092

[22] Filed: May 4, 1992

[51] Int. Cl.$^5$ .............................................. B01D 39/02
[52] U.S. Cl. ................................ 210/488; 210/497.2; 55/487; 55/524; 55/DIG. 24
[58] Field of Search ............... 210/483, 488, 489, 490, 210/497.2; 55/487, 524, DIG. 24

[56] References Cited

U.S. PATENT DOCUMENTS

| | | | |
|---|---|---|---|
| 3,937,860 | 2/1976 | Gusman et al. | 428/228 |
| 3,975,565 | 8/1976 | Kendall | 428/284 |
| 4,206,034 | 6/1980 | Broadhurst | 208/33 |
| 4,324,574 | 4/1982 | Fagan | 55/487 |
| 4,427,425 | 1/1984 | Briggs et al. | 55/159 |
| 4,726,989 | 2/1988 | Mrozinski | 210/500.36 |
| 4,938,786 | 7/1990 | Tonomoto | 55/487 |
| 4,965,032 | 10/1990 | Pall | 264/160 |
| 4,976,858 | 12/1990 | Kadoya | 55/487 |
| 5,085,773 | 2/1992 | Danowski | 210/446 |

FOREIGN PATENT DOCUMENTS

| | | |
|---|---|---|
| 867482 | of 0000 | Belgium . |
| 2440685 | of 0000 | Fed. Rep. of Germany . |
| 2853446 | of 0000 | Fed. Rep. of Germany . |
| 1518995 | of 0000 | France . |
| 3004822 | of 0000 | Japan . |
| 3276533 | of 0000 | Japan . |
| 3278517 | of 0000 | Japan . |
| 8076118 | of 0000 | Japan . |
| 534535 | of 0000 | U.S.S.R. . |
| 1346199 | of 0000 | U.S.S.R. . |

OTHER PUBLICATIONS

Kirk-Othmer Encyclopedia of Chemical Technology 3rd Edition vol. 10 "Filter Media" pp. 293-297.

*Primary Examiner*—Robert A. Dawson
*Assistant Examiner*—W. L. Millard
*Attorney, Agent, or Firm*—Joseph J. Allocca

[57] ABSTRACT

An apparatus and method for removing particles from refinery fluid hydrocarbon and organic streams comprising an elongated housing containing multiple layers of non-woven fabric arranged in said housing as discrete stratified layer array of filter fabric of increasing particle retentive power thus arranged in the housing in the direction of fluid flow. The fabric layer comprise thermally stable materials of different permeability which are mineral coated to provide structural, fluid compression resistance, and to which flint or talc particles are added to impact surface roughness to the fibers. A final layer of uncoated needled felt fine fabrics end caps the array. In operation the refinery fluid is passed through the filter array such that the direction of fluid flow is in the direction of increasing retentive power of the filter fabric array. The use of fabrics rather than particle beds permits the use of separation units of vertical upflow configurations in which gravity assists in particle retention and removal.

7 Claims, No Drawings

FILTER COMPRISING MULTIPLE LAYERS OF NON-WOVEN FILTER FABRIC OF DECREASING POROSITY

BACKGROUND OF THE INVENTION

1. Field of the Invention

The present invention is a filter apparatus for removing particulates from refinery fluid streams, e.g., liquid or gaseous hydrocarbon and organic streams. The apparatus comprises a stratified array of non-woven fabrics of increasing particle retentive power, in which fibers contained in the fabrics have been mineral coated to provide high temperature resistance, structural and fluid compression resistance and surface roughness. These layers are followed by a final layer of uncoated needled felt cloth end capping the stratified array. Refinery fluid streams are passed through the array where the direction of flow of the fluid is in the direction of increasing particle retentive power of the filter fabric array.

2. Description of Related Art

Particle removal from refinery fluid streams such as cat cracker bottoms, wax hydrofiner feed or organic solvents is necessary to avoid plugging catalyst beds, fouling heat exchangers, damaging membrane elements in membrane separation process or eroding structural elements, valves or piping through which flow the particle laden refining stream.

Cartridge filters have been used but they can blind rapidly and require frequent changing resulting in down time and high cost. Sand filters are an alternative, but disposal of contaminated sand and replacement are costly.

SUMMARY OF THE INVENTION

A refinery fluid stream, (e.g. liquid or gaseous hydrocarbon or organic stream), filter is described which removes from the stream, particles suspended therein in the order of decreasing particle size, i.e., coarse particles are removed first followed by particles of increasing fineness/decreasing coarseness down to fine colloidal type material. Said filter comprises stratified layers of non-woven fabric arranged in an elongated housing element in order of increasing particle retentive power. The object is to deposit particles uniformly through the filter to avoid cake formation and the consequential rapid increase in pressure drop. As used herein and in the appended claims the term "order of increasing particle retentive power" means that the fabric is arranged in the housing element in the order of decreasing coarseness, that is, coarse fabric is in the first fabric strata encountered by a fluid stream which is introduced into the filter, this coarse fabric trapping the coarse particle in the stream; subsequent layers of fabric of decreasing coarseness are encountered as the fluid stream progresses through the filter whereby particles of increasing fineness are trapped as the fluid progresses through the filter.

The filter element comprises stratified layers of fabric of decreasing coarseness in the housing element. The decrease in coarseness need not be a smooth linear progression but can and preferably does proceed step wise. One or multiple layers of coarse fabric can be followed by one or multiple layers of a finer fabric followed, if desired, by successive layers of even finer material.

These multiple layers of fabric of decreasing coarseness/increasing fineness are described as non-woven fabrics and can be made of glass fiber or mineral fiber or of thermoplastic fibers such as polyolefin (e.g., polyethylene, polypropylene), polyamide (e.g., nylon 6 or nylon 66), polyester (e.g., polyethylene terephthalate or polybutylene terephthalate), polycarbonate, fluorinated polymer (e.g., Teflon (polytetrafluorothylene)), etc. depending on the temperature resistance required. For convenience the fabrics are denoted coarse, medium and fine. The properties which characterize this grouping of fabrics are summarized in Table 1. The figures in brackets are typical values.

The fibers contained in the non-woven fabric layers are mineral coated to provide structural compression resistance and surface roughness to the array so that the fabrics do not collapse under load and retain their open structure to accommodate particles without excessive pressure drop. The coarse layers receives the highest level of mineral coating which can include the addition of grit to the mineral to enhance the level of surface roughness exhibited by the coarse layer(s). These coarse layers are marked by minimal pressure drop. The subsequent layers of decreasing coarseness/increasing fineness are also mineral treated, again for structural strength and fluid compression resistance. Those mineral coatings may contain finer grit to contribute a lesser degree of surface roughness to those subsequent layers. Alternatively, the mineral coating will contain no particles at all. A final untreated layer of needled felt cloth endcaps the array. Each layer can be characterized by its permeability, the coarse layer being the most permeable with minimal pressure drop, each optional successive layer having lower permeability than the preceding layer and a concomitant increased pressure drop. The final layer, e.g., needled felt cloth as disclosed in U.S. Pat. No. 4,206,034 will be the layer of least permeability/highest pressure drop and will also be the layer which removes the smallest/finest particles from the liquid streams.

Pressure drop is defined as the pressure drop per unit thickness of the fabric (psi/inch) for a standard hydrocarbon (density 0.85 gm/cm$^3$, viscosity 7.0 centipoise) flowing at a superficial velocity of 0.42 cm/sec through the fabric.

TABLE 1

PROPERTIES OF COARSE, MEDIUM AND FINE FILTER FABRICS

| FABRIC TYPE | RESIDUE (%) | FIBRE ROUGHNESS (rms microinch) | FIBRE DIAMETER (cm) | PRESSURE DROP (psi/inch) |
|---|---|---|---|---|
| COARSE | 40–60 | 100–500 | .015–.06 | 0.01 to 0.05 |
| (eg. 3M Black) | (48.6) | (355) | (.03) | (.015) |
| MEDIUM | 15–40 | 20–100 | .005–.015 | .02 to 1.0 |
| (eg. 3M Green) | (19.1) | (51) | (.015) | (.023) |
| (Super Polish TP #1) | (38.7) | (61) | (0.005) | (0.023) |
| FINE | 0–20 | 3–20 | .001–.005 | 0.5 to 10.0 |
| (U.S. Pat. No. 4,206,034) | (0.3) | (3) | (.0014) | (5.39) |

Intermediate coarseness materials (medium fabric) can be interposed between the layers of coarse and fine materials. Such medium fabric layer would have fiber roughness, pressure drop, and filament diameter falling in the range between the ranges recited for the coarse and fine materials. Alternatively, medium layers of lower permeability than the coarse layer can be made by coating the same fabric as used in the coarse layer with a resin coat (preferably omitting any grit which may have been used when resin coating the coarse layer) and mechanically compressing the layer to reduce its overall thickness. Such mechanical compression results in an increase in pressure drop. Preferably, however, the medium or intermediate coarseness layer will be made of different material than the coarse layer and will be of finer filaments. The filtration fabrics used are all non-woven to take advantage of the random nature of the fiber orientation and to avoid the regular interlacing structures in woven fabrics which tend to clog with particles.

As previously stated, the layers of material, except for the last low permeability high pressure drop layer, are mineral coated.

The mineral coating is preferably an aluminum oxide coating applied to the fabric material in varying amounts and bonded to the fabric by use of a resin, preferably a phenolic resin. The coated fabric is then oven cured. Single or multiple coatings can be used to deposit the mineral coating layer in the fabric. Particulates of varying degrees of coarseness (e.g., flint, grit, talc, etc.) can be added to the coating to impart different degrees of surface roughness and abrasion properties.

The purpose of the mineral coating is to reduce the compressibility of the fabric to minimize pressure drop, provide high void volume to accommodate particulates, and increase resistance to high temperatures. The amount of coating is measured by ashing the fabric in air at 800° C. and measuring the percent residue. The amount of residue is usually the highest for coarse fabrics, ranging down to zero for the fine fabrics as shown in Table 1.

Particulates of varying nature (e.g. grit, talc) can be added to the mineral coating to impart different degrees of surface roughness to the fibers. This property is measured by taking electron photo-micrographs of individual fibers, measuring the amplitude of the surface profile in a number of locations in microns, and taking an average. An rms valve in micro inches is then calculated from this measurement by multiplying this amplitude by a constant factor of 10.23 derived from computing the root mean square of a random saw tooth wave function similar in shape to the fiber surface, and converting from microns to micro inches.

As shown in Table 1, coarse fabrics have fibers with the highest surface roughness. Fine fabrics usually have no added particulates to increase surface roughness.

The non-woven fabrics are preferably polyamide (nylon) or polyester. Fabric weight as expressed in fiber diameter is a combination of the raw fiber diameter and the mineral coating. As shown in Table 1, the coarse fabrics contain the thickest fibers. Fiber diameter is determined by microscopic measurement.

The design of the filter bed will depend on the nature and size distribution of the particulates being removed. Initial pressure drop is usually quite low using these fabrics. The objective is to arrange the strata of the fabrics to accomplish as uniform a distribution of particulate loading as possible. This slows down the rate of pressure drop increase, and extends the time between bed cleaning or replacement. The final pressure drop will be limited by the allowable pressures in the filter vessel and connected piping. It is expected that the final pressure drop will be a large multiple of the initial pressure drop, possible 20 to 50+ times.

In fabricating the filter element the fine uncoated filter cap piece, sized to fit the interior dimensions of the housing vessel yet large enough to prevent fluid bypass along the outer edge at the vessel wall, is inserted into the housing. Successive discrete layers of fine mineral coated fabric to coarse, mineral coated fabric are inserted into the housing. The layers are not interspersed but are discrete, stratified layers. The layers fit snugly within the housing to prevent fluid bypass along the edges.

The housing preferably has a central screw thread axis running coaxially down the center axis of the vessel. The layers of filter material are centrally pierced to slide over this screw threaded central axis. The central hole is sized so as to provide a snug fit around the central screw thread axis.

Assembly comprises fitting a layer (disc) of filter material into the vessel, each disc/layer being centrally pierced by the screw threaded axis. A perforated plate sized to fit the interior dimension of the vessel and equipped with a centrally located screw threaded hole fits over the screw thread axis, and behind the filter material disc, the screw threads of said axis and of said perforated plate engaging. The perforated plate is screwed down the central axis, moving the layer of filter material before it into place down the housing vessel.

This perforated plate can be screwed into and unscrewed out of the housing vessel as often as needed to fill the housing with filter material.

Preferably, each discrete layer (not each individual disc, but each disc or group of discs defining a discrete layer, such as coarse, medium, fine, etc.) will be separated from other discrete layers by a perforated plate interposed between each such layer.

The screw threaded perforated plate can be used to compress selected layers of filter material thereby creating layers of more densely packed filter material.

These compressed, higher density layers exhibit decreased permeability and increased pressure drop but such compression is an efficient way of increasing the overall effective filter fabric thickness in the housing. For Example 9 feet of fabric material can be compressed to 3 feet in thickness, this 3 feet of actual thickness being in effect 9 feet of effective filter material thickness, thus increasing the filter capacity of the filter without the need of resorting to excessively long/large vessels.

When used to compress layers of filter material, the screw threaded perforated plate must be left in place to prevent resilient decompression of the compressed layer.

The threaded central axis can be attached at one end to the internal outlet end of the filter housing vessel. Alternatively the threaded central axis can be loaded with the discrete stratified layers of filter material outside the housing then inserted into the housing and end flanged into place in the housing.

In operation, the fluid is introduced into the filter at the end of the housing at which the most coarse filter material is located and flows toward the outlet at which end is located the most fine filter material. The feed is fed at sufficient pressure to overcome the pressure drop generated in the filter element by the layers of filter material.

A potential advantage may lie in locating the fine layer at the top of the bed, and passing the fluid vertically upwards through the bed. In this way, gravity assists in removing the more dense and heavier particles. In the case where the particulates are buoyant, the reverse configuration would be preferred.

Filter life is determined by measurement of the particulate content of the effluent. When a noticeable increase in effluent particulate content is observed (i.e. breakthrough) the effective useful life of the filter has been exceeded. Alternatively, filter life can be set by the safety valve limit on the filter housing. When element pressure drop reaches the safety valve limit, filter element useful life has been reached and the element is taken off line for washing or replacement.

EXAMPLE 1

A filter housing vessel 10 feet long and 4 inches in diameter was prepared. This vessel could accommodate 24,711 cubic centimeters of filter material.

This vessel was inserted into a closed fluid flow circuit fitted with a pump and a sample addition bomb (1000 cm$^3$). Flow in the circuit was set at 0.54 U.S. gallons per minute.

Spent fluid cat cracking catalyst having an average particle size of 67 microns was selected as the source of test particles. This spent FCC catalyst was suspended in Mentor 29 oil which has a viscosity at 70° F. of about 5.5 cps.

Two test beds were prepared:

Bed 1 used 1 inch of uncoated needled felt as the end cap material. This needled felt material was secured from Industrial Filter and Fabrics and identified as F-20. It has a filament diameter of 0.002 cm and a permeability of 4.91 psi/inch thickness. One hundred nineteen inches of coarse material secured from 3M Company (3M Coarse Black) was used as the coarse layer.

Bed 2 used one inch of needled felt filter cloth previously identified as F-20. An intermediate layer of 9 feet of filter material secured from 3M identified as Super Polish TP #1 compressed to 3 feet was placed behind the needled felt layer.

The balance of Bed 2 comprised 83 inches of 3M Super Polish TP #1, uncompressed. 3M Super Polish TP #1, has a filament diameter of 0.005 cm and a permeability of 0.023 psi/inch thickness of material. This material is 50 denier polyester with talc particles in the mineral coating. The mineral coating is 38.7% and surface roughness is 61 micro inches.

In evaluating test Bed 1 a total of 3046 grams of particulate were injected into the circulating stream. Fifteen injections of particulates were employed. When the inlet pressure in the circuit reached 140 psi, the limiting safety factor for the test equipment, particle injection and circulation were terminated. Pressure gauges were located in the vessel at about 2 feet from the inlet, 4 feet from the inlet, 6 feet from the inlet and 9 feet from the inlet. At the termination of run, inlet pressure was 140 psig. The pressure drop measured at the gauge located at 9 feet from the inlet measure was 136 psig.

Upon opening the housing from the inlet end, about 480 grams of untrapped particles were recovered in drainage. Each foot of the bed was examined and a particle capture measurement made. The one foot of bed nearest the inlet captured 53 grams of particles, each foot thereafter recovered 64, 85, 92, 114, 147, 177, 139 and 1030 grams of particles respectively for a total recovered particle weight of 2495 grams. No particles were recovered from the one inch of needled filter felt F-20 material located at the outlet.

Test Bed 2 was similarly run until an inlet pressure of 142 psi was reached. At that point the pressure gauge located 9 feet from the inlet measured a pressure drop of 132 psi. This point was reached after only 9 injections of particles had been made. Upon opening the vessel 720 grams of untrapped particles were recovered in drainage. Each foot of bed was examined and a particle capture measurement made. The one foot of bed nearest the inlet captured 50.3 grams of particles, each bed foot hereafter recovered 41.9, 33.4, 32.6, 27.3, 26.4, 24.8, 67.8, 68.3 and 1105.1 grams respectively. The last three measurements are for the 3 foot deep compressed fiber filter material portion of the test bed. A total of 2197.9 grams of particles were recovered.

Test Bed 1 recovered 10.2 vol% of particulates at 140 psi whereas test Bed 2 recovered 6.3 vol% of particulate. Test Bed 1 captured 41% of its total particulate in the top 1 foot of the bed whereas Bed 2 recovered 50% of its total particulates in the top 1 foot of the bed.

EXAMPLE 2

Test Bed 1 was used to filter 1250 gallons of a 150 N slack wax. Operation was on a once through rather than circulating basis and was for 45 continuous hours. At the end of the 45 hours the Δp was 5 psig. The wax contained particles having a number average size of ~2μ. These measurements were taken at the beginning, middle and end of run at the inlet and outlet. Particle concentration in ppm were found to be as follows:

|  | Concentration (ppm) | | Volume Average (Size) μ | |
| --- | --- | --- | --- | --- |
|  | In | Out | In | Out |
| Beginning | 27 | 16 |  |  |
| Middle | 23 | 16 | 4.8 | 4.8 |
| End | 29 | 27 |  |  |

The rate of pressure drop increase was low. The wax was clear white when sampled, both in and out. It was concluded that a finer bed was needed to remove the smaller particles in the wax.

EXAMPLE 3

A revised bed structure was fabricated. Bed 3 comprised 12 inches of needled felt filter cloth secured from P&S Textiles and covered by U.S. Pat. No. 4,206,034. This material has a filament diameter of 0.0014 cm and a permeability of 5.39 psi/inch thickness. Following the needled felt filter cloth was 108 inches of 3-M cloth 9650 CTH4-1 (Green) compressed three times to an actual bed layer thickness of 36 inches. This fabric has a filament diameter of 0.015 cm and a permeability (uncompressed) of 0.023 psi/inch. The mineral coating constituted 19.1%. The coating contained flint and exhibited a surface roughness of 51 rms micro inches.

This 36 inch layer was followed by 72 inches (uncompressed) of 3M Coarse Black.

This Bed 3 was evaluated on ½ barrel of dark wax. The results are tabulated below:

|  | At Inlet | At Outlet |
| --- | --- | --- |
| Color | 10 TR | 15-18 TR |
| Particulates (ppm) | 58 | 15-27 |
| Average Particulate Size (μ) | 20 | 5.5 |
| Toluene Solubles | 24 | 0-2 |
| Toluene Insolubles | 34 | 13-22 |
| Δp (psi) | 5 |  |

The feed was passed through the Test Bed 3 at 125° C. to keep it liquid.

It was concluded that the revised bed structure reduced toluene soluble particulates to a negligible amount, significantly improved wax color, and significantly reduced total particulates.

What is claimed is:

1. A filter comprising multiple layers of filter material for the removal of particulates suspended in a fluid in the order of decreasing particle size, said filter comprising stratified layers of non-woven fabric arranged in a housing in order of increasing particle retentive power such that the stratified fabric layers are in the order of decreasing coarseness in the direction of liquid flow wherein the layers of filter material are ordered coarse material followed by finer material in the direction of fluid flow, the aforesaid filter materials comprising fabrics which are coated with a mineral coat.

2. The filter of claim 1 wherein the layers of filter material are arranged in the order coarse, medium and fine in the direction of fluid flow.

3. The filter of claim 2 wherein the mineral coat contains flint, grit, or talc.

4. The filter of claim 3 wherein the coarse filter material has 40-60% mineral coat, has a fiber roughness of 100-500 rms micro inches, a fiber diameter of 0.015 to 0.06 cm and a pressure drop of 0.01 to 0.05 psi/inch of material thickness.

5. The filter of claim 3 wherein the medium filter material has 15 to 40% mineral coat, has a fiber roughness of 20 to 100 rms micro inches, a fiber diameter of 0.005 to 0.015 cm and a pressure drop of 0.02 to 1.0 psi/inch of material thickness.

6. The filter of claim 3 wherein the fine filter material has 0 to 20% mineral coat, has a fiber roughness of 3 to 20 rms micro inches, a fiber diameter of 0.001 to 0.005 cm and a pressure drop of 0.5 to 10.0 psi/inch of material thickness.

7. The filter of claim 1 wherein the stratified layer of mineral coated non-woven fabric arranged in the order of increasing particle retentive power is end capped by a final layer of uncoated needled felt fine fabric.

* * * * *